United States Patent Office 3,477,825
Patented Nov. 11, 1969

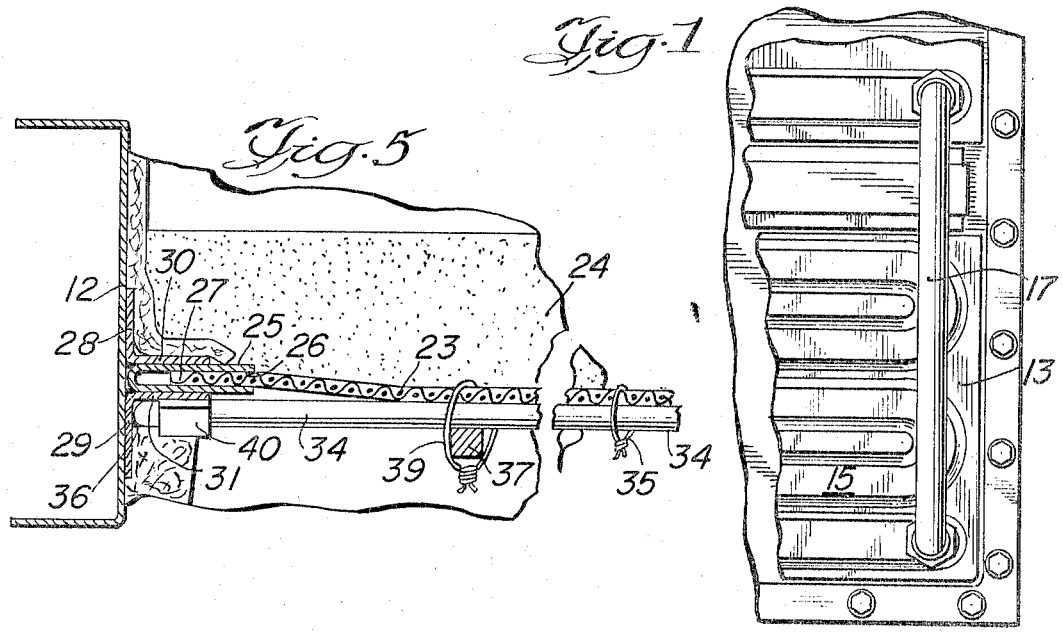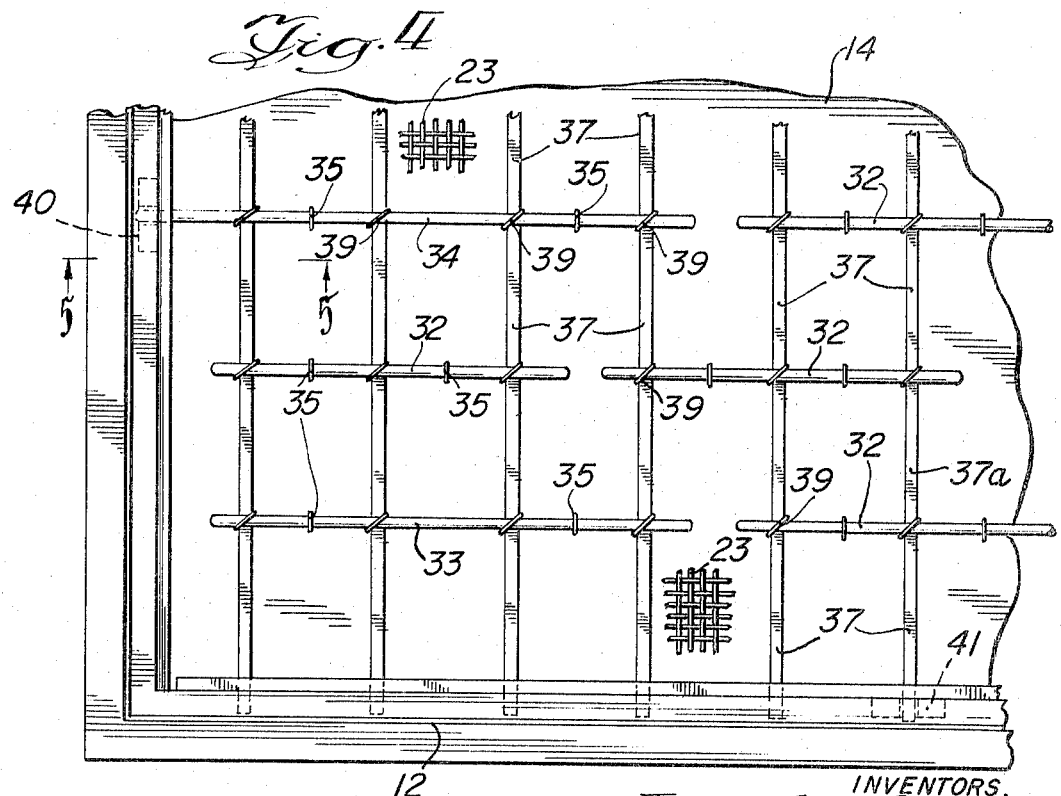

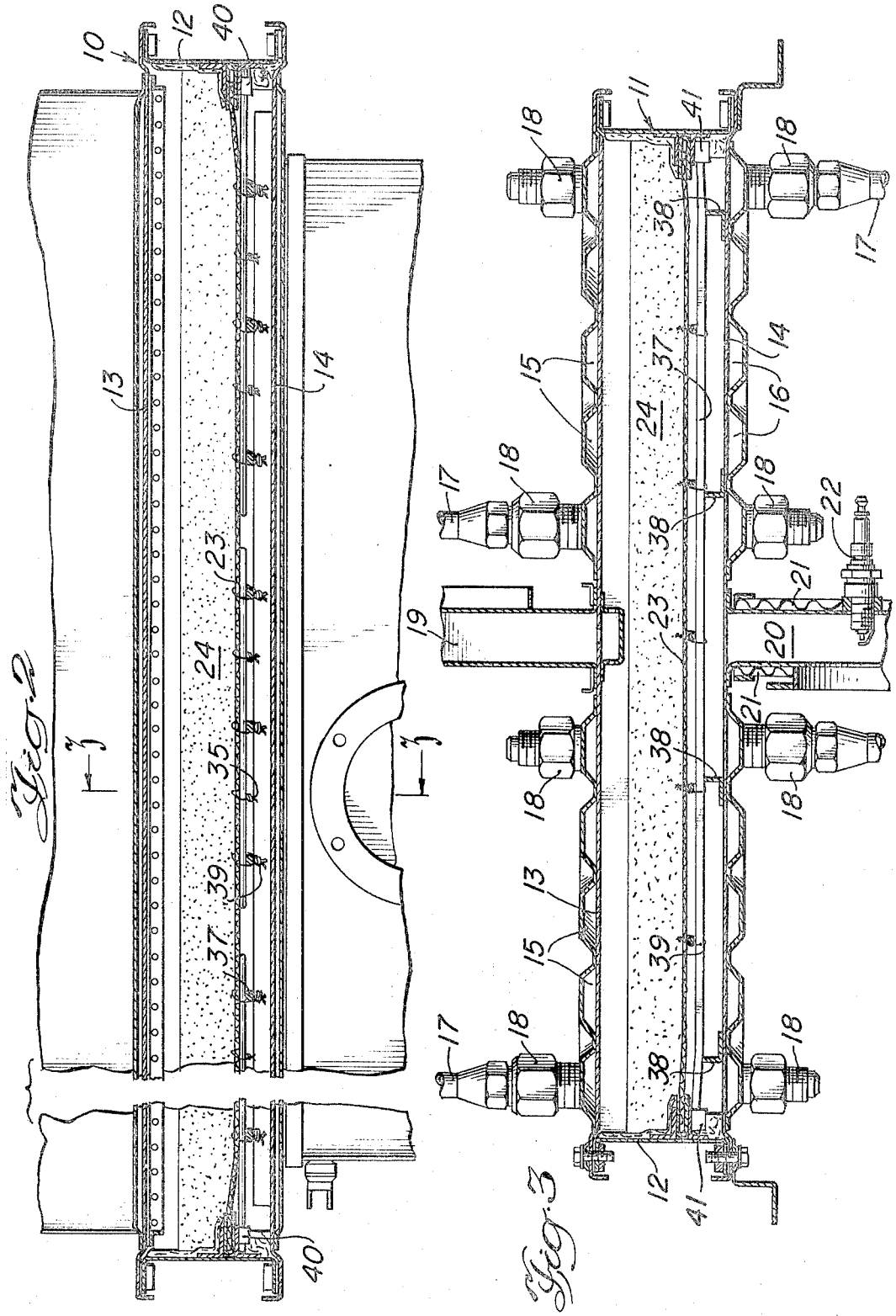

3,477,825
SUPPORT ASSEMBLY FOR A CATALYTIC GAS GENERATOR
James W. Lannert, St. Joseph, and James J. Anderson, Stevensville, Mich., assignors to Whirlpool Corporation, a corporation of Delaware
Filed Jan. 4, 1965, Ser. No. 422,973
Int. Cl. B01j 7/00, 9/02
U.S. Cl. 23—281                           2 Claims

ABSTRACT OF THE DISCLOSURE

A reactor for producing an atmosphere rich in carbon dioxide by the catalytic combustion of a fuel in which the catalyst is retained on a screen that is reinforced by stiffener rod members and with these rod members and the screen and the catalyst bed thereon being supported by spaced support rod members.

---

This invention relates to a catalytic reactor for generating a carbon dioxide rich atmosphere that is useful for preserving animal and plant materials such as foods and particularly to improvements in the support means for supporting the catalyst bed.

In the prior patents of K. Bedrosian et al. Nos. 3,102,-778 and 3,102,780, assigned to the same assignee as the present application, there are disclosed apparatus and methods for preserving animal and plant materials by the use of a controlled atmosphere containing greater amounts of carbon dioxide and lesser amounts of oxygen than those found in ordinary air. An essential feature of the disclosures of these patents is the carbon dioxide rich atmosphere generator.

A catalytic reactor for reacting the hydrocarbon fuel and oxygen in the presence of a catalyst to produce such an atmosphere is disclosed and claimed in the James W. Lannert copending application Ser. No. 321,607, filed Nov. 5, 1963 now abandoned and also assigned to the same assignee as the present application. The reactor of the present invention is generally similar to the one disclosed in this copending application but has additional desirable features not disclosed in the prior application.

One of the features of this invention is to provide an improved reactor of the above type in which a bed of a granular catalyst is provided and in which the bed support is constructed so as to minimize changes in thickness of the bed during expansion and contraction of the parts of the reactor during changes in temperature.

Other features and advantages of the invention will be apparent from the following description of one embodiment thereof taken in conjunction with the accompanying drawings. Of the drawings:

FIGURE 1 is a fragmentary plan view showing a portion only of a reactor embodying the invention.

FIGURE 2 is a fragmentary transverse sectional view taken through the vertical center of the reactor showing the catalyst containing portions thereof and the inlet and outlet manifolds.

FIGURE 3 is a sectional view taken substantially along line 3—3 of FIGURE 2.

FIGURE 4 is a fragmentary plan view of the reactor omitting the catalyst bed and showing the support for the catalyst.

FIGURE 5 is an enlarged fragmentary sectional view illustrating a portion of the structure of FIGURE 3.

The reactor 10 of this invention comprises a frame 11 having sides 12, a top 13 and bottom 14. As is shown and described in greater detail in the above copending Lannert application, the top and bottom are cooled by water passages 15 and 16 supplied with water through tubes 17 and couplings 18. As these form no part of the present invention they are not shown and described in detail.

Also forming a part of the reactor are an inlet manifold 19 at the top of the generator and an exhaust manifold 20 at the bottom. The exhaust manifold is insulated as indicated at 21 and is provided with a spark plug 22 for initiating combustion.

The reactor has other elements and controls that are described in more detail in the Lannert application but which are not shown and described here because they form no part of this invention.

Extending between the side walls, which in a rectangular reactor will include both end and lateral walls, is a gas pervious support 23 in the form of a metal screen. This supports the weight of a granular catalyst bed 24 that catalyzes the low temperature reaction of oxygen with a carbonaceous fuel to form an atmosphere rich in carbon dioxide. Catalysts of this type have been described in detail in the above Bedrosian Patent 3,102,778.

The screen 23 has its edges loosely received in U-shaped channel members 25 each having an open side 26 facing away from its fall 12 and loosely receiving an edge 27 of the screen. Each channel member is tack welded at intervals along frame 11 and held between a pair of upper and lower right angle brackets 28 and 29 having spaced parallel horizontal legs 30 and 31 between which the channel member 25 is positioned. As the edges 27 of the screen are loosely held by the channel members, the screen is free to expand and contract during heating and cooling.

In order to strengthen the flexible screen 23 there is provided on the bottom thereof spaced stiffener rod members 32, 33 and 34. The stiffener rods are arranged in spaced but linearly aligned sets with the center set including end rods 34 as indicated in FIGURE 4 and an intermediate rod 32. The set adjacent a side wall 12 includes a pair of the shorter rods 32 and a longer rod 33 at one end. At the rods intermediate the center set and the side set, as illustrated at the middle of FIGURE 4 there is provided two short rods 32 and a longer rod (not shown) 33.

Each of the rods 32 and 33 is attached to the screen 23 by a pair of wire ties 35 engaging both the screen 23 and the stiffener rod as illustrated in FIGURE 5. In each of rods 32 and 33 one of the ties holds the rod tightly against the screen in order to retard relative movement therebetween while the other tie is loose as illustrated at 35 in FIGURE 5.

The end center rods 34 have one end of each attached as by spot welding 36 to the frame 12 and particularly to the lower bracket 29. In these instances both of the ties 35 are loose, as relative shifting of these end rods 34 is prevented by the attaching of the end of the rod to the frame.

These stiffener rods 32, 33 and 34 are designed to prevent buckling of the screen 23 and are not for support purposes. The support of the screen 23 is provided by support rod members 37 that are preferably of square cross section, as shown mostly clearly in FIGURES 2 and 5. The ends of these support rods are adjacent the lateral side walls 12 of the frame 11. The support rods 37 rest on the tops of spaced parallel angles 38 located on the bottom 14 of the frame 11. The support rods 37 where they cross a stiffener rod 32, 33 or 34 are tied to the stiffener rods and the screen 23 by wire ties 39. Other ties 35 loosely attach the stiffener rods 32–34 themselves to the screen 23. These ties 35 and 39 are loose so that the stiffener rods and support rods can move relative to each other and to the screen. The center support rod 37a is positioned to its side wall 12 by surrounding support brackets 41 which are attached to the bottom of each lower horizontal leg 31. The previously described end center stiffener rods 34 are limited in their lateral movement by encircling support brackets 40 which are attached to the bottom of each lower horizontal leg 31. Although the brackets 40 encircle the bottom of these end rods 34, the brackets and rods are not attached together. Also, the center support rod 37a is not attached to brackets 41.

As can be seen in FIGURE 3, each of the support rods 37 is preformed so as to be generally bent downwardly at their centers which is toward the base means or supporting flanges 38. This permanent downward distortion is provided so that all movement due to expansion and contraction will be directed horizontally. This aids in preventing a wavey distortion of the screen under these forces which would tend to cause shifting of the granular catalyst bed 24 which would tend to create thin spots in the bed.

The reason for securing the central end stiffening rods 34 and the center support rod 37a against lateral movement by means of the brackets 40 and 41 is so that the screen 23 will be maintained centered within the frame 11 during expansion and contraction forces of heating and cooling.

Having described our invention as related to the embodiments shown in the accompanying drawings, it is our intention that the invention be not limited by any of the details of description, unless otherwise specified, but rather be construed broadly within its spirit and scope as set out in the accompanying claims.

The embodiment of the invention in which an exclusive property or privilege is claimed is defined as follows:

1. A reactor for generating an atmosphere rich in carbon dioxide by the catalytic combustion of a fuel, comprising: an enclosing frame having side and end walls; a gas pervious support in said frame for supporting the weight of a granular catalyst bed; a series of spaced support rod members beneath and bearing said gas pervious support, each having opposite ends; and base means in said frame beneath and engaged by said support rod members, said support rod members being permanently distorted downwardly between said ends toward said base means.

2. A reactor for generating an atmosphere rich in carbon dioxide by the catalytic combustion of a fuel, comprising: an enclosing frame having side and end walls; a gas pervious support in said frame for supporting the weight of a granular catalyst bed; a channel member on each of said side and end walls each having an open side facing away from its wall and loosely receiving an edge of said support for loose retention in its said channel; spaced stiffener rod members beneath said support; means for attaching said stiffener rod members to said support; spaced support rod members beneath and bearing said stiffener rod members and thus said support, said support rod members being at least approximately parallel and arranged between opposite side walls, one of said support rod members being substantially at the center of said frame and being restrained against substantial lateral movement only, said stiffener rod members being transverse to said support rod members and including one having an end adjacent one of said walls and attached thereto, and said stiffener rod members being arranged in a plurality of sets each made up of a plurality of linearly aligned spaced stiffener rod members and all sets being substantially parallel to each other, one of said sets being arranged substantially at the center of said frame with the end rod members having their ends attached to said frame; and base means in said frame beneath and engaged by said support rod members, said support rod members being permanently distorted downwardly between said ends toward the base means.

References Cited

UNITED STATES PATENTS

| | | | |
|---|---|---|---|
| 3,203,770 | 8/1965 | Ranum | 23—281 |
| 2,216,763 | 10/1940 | Boyce. | |
| 2,989,383 | 6/1961 | Miller | 23—288 |

JAMES H. TAYMAN, JR., Primary Examiner

U.S. Cl. X.R.

23—288; 34—237, 239